W. FRICK.
SYSTEM FOR PREVENTING SHAFT VOLTAGES OR BEARING CURRENTS IN ELECTRIC MACHINES.
APPLICATION FILED APR. 9, 1910.

1,100,294. Patented June 16, 1914.

Witnesses:
Cyril S. Brown,
Minnie C. Bender.

Inventor:
Walther Frick
by Foster Freeman Watson & Cort
Attys

UNITED STATES PATENT OFFICE.

WALTHER FRICK, OF FRANKFORT-ON-THE-MAIN, GERMANY, ASSIGNOR, BY MESNE ASSIGNMENTS, TO GENERAL ELECTRIC COMPANY, A CORPORATION OF NEW YORK.

SYSTEM FOR PREVENTING SHAFT VOLTAGES OR BEARING-CURRENTS IN ELECTRIC MACHINES.

1,100,294.           Specification of Letters Patent.     Patented June 16, 1914.

Application filed April 9, 1910. Serial No. 554,463.

*To all whom it may concern:*

Be it known that I, WALTHER FRICK, a subject of the German Emperor, residing at Frankfort-on-the-Main, Germany, have invented certain new and useful Improvements in Systems for Preventing Shaft Voltages or Bearing-Currents in Electric Machines, of which the following is a specification.

This invention relates to improvements in a system for preventing shaft voltages or bearing currents in electric machines. Such bearing currents and voltages, which are set up in the shafts and bearings of electrical machines are particularly injurious in the bearings of the said machines. They are produced by magnetic fluxes which pass in part through the stator and in part through the rotor of the machine, and they are variable as to their strength and direction, and are caused by unsymmetrical construction of the stator or rotor which may be caused for example by the joints of such parts. These fluxes are produced in machines of any character, whether the field of the stator (an alternating or rotating field) be produced by a rotating magnet wheel which is separately energized by direct current, (synchronous machines), or by currents which flow within the stator (asynchronous machines). These fluxes are closed over the shaft, one of the bearings, the base plate, the second bearing, and the shaft, and they are injurious to the bushing of the bearing as well as to the oil of the same.

The object of the present improvements is to provide means to counteract the said obnoxious bearing currents. And for this purpose a winding is arranged on the stator in such a way, that a voltage is produced therein by the influence of the field fluctuation which causes the shaft voltage, and which is directly or indirectly used for counteracting the said bearing currents.

For the purpose of explaining the invention more in detail, several examples embodying the same have been shown in the accompanying drawing in which the same letters of reference have been used in all the views to indicate corresponding parts.

Figure 1:
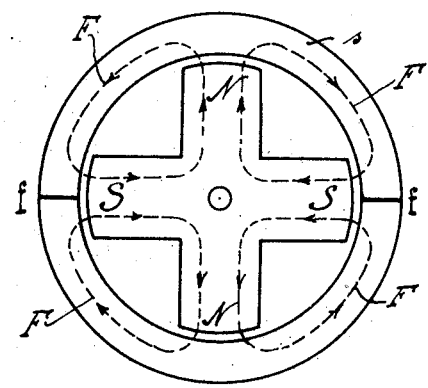
Figure 2:
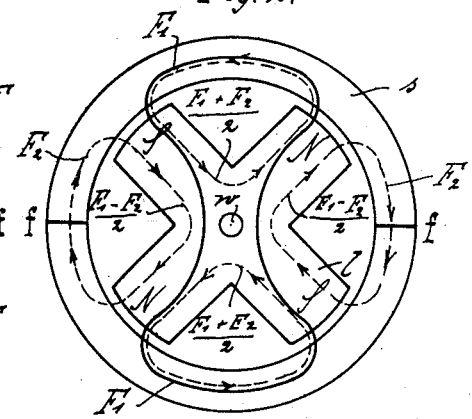
Figure 3:
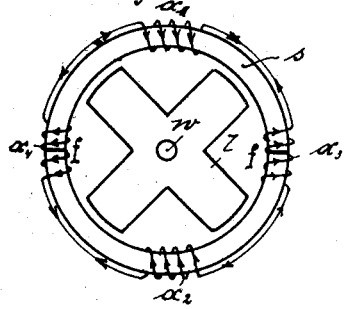
Figure 4:
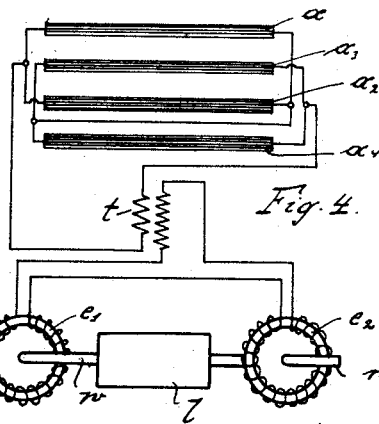
Figure 5:
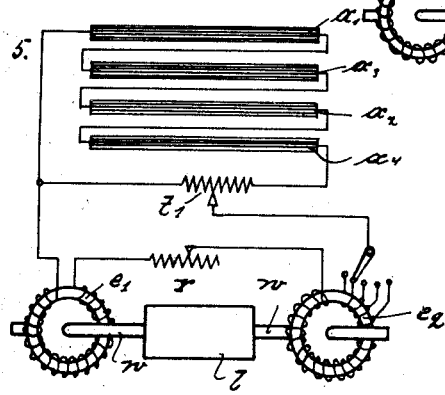
Figure 6:
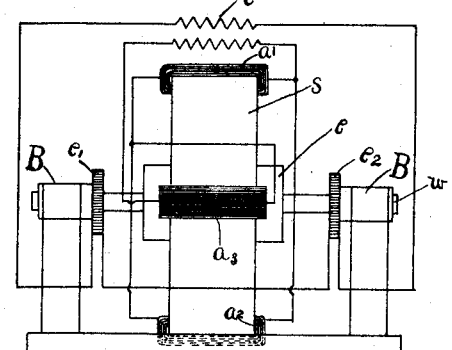

In said drawing—Figure 1, is a diagrammatical side view of an electric machine in which the cause of the field fluctuation and the shaft voltage set up thereby are illustrated, the example showing as a cause for the unsymmetric magnetic flux the joint of the stator, and the position of the rotor being such that the magnetic flux is symmetrical, Fig. 2, shows the same machine in a different position of the rotor, in which the magnetic flux is unsymmetric, Fig. 3, is a diagrammatical side view of a machine in which a ring winding is provided on the armature for counteracting the effect of the unsymmetric field, and Figs. 4 and 5, are similar views illustrating further examples of the improved system. Fig. 6 is a view of a dynamo-electric machine with this invention applied thereto.

Referring to Figs. 1 and 2 of the drawing, Fig. 1 shows an electric machine in the position in which the centers of corresponding poles S S of the rotor are just opposite the joints $f$ $f$ of the stator. All the magnetic fluxes F are symmetric and equal to one another, because the magnetic resistances are the same in the four quadrants through which the said fluxes pass.

In Fig. 2 the same machine is illustrated, the rotor having turned at an angle of 45 degrees. In this case the fluxes are unsymmetrically distributed in the quadrants the limits of which are shown by the center lines, because the stator fluxes $F_2$ $F_2$ which traverse the joints find a greater resistance than the stator fluxes $F_1$ $F_1$. Therefore the last named fluxes are greater than the fluxes $F_2$ $F_2$. But as the magnetomotive forces and the magnetic resistances and therefore also the magnetic fluxes of the rotor must be the same in all the quadrants, from the total flux $F_1$ a sectional flux $$\frac{F_1 - F_2}{2}$$

is branched off which passes through the quadrant belonging to the magnetic flux $F_2$. In this case the quadrants which are opposite to the joint of the stator are traversed by the fluxes $$F_2 + \frac{F_1 - F_2}{2} = \frac{F_2 + F_1}{2},$$

and the other quadrants are traversed by the fluxes $$F_1 - \frac{F_1 - F_2}{2} = \frac{F_1 + F_2}{2}.$$

Therefore the stator flux $F_1$ is divided in two parts, and the larger part $$F_1 - \left(\frac{F_1 - F_2}{2}\right)$$

traverses a quadrant corresponding thereto, and in a way similar to the flux $F_2$, as is shown in dotted lines, and the said flux is such that it is closed over a pair of coöperating poles. The path of the other part $$\frac{F_1 - F_2}{2}$$

is indicated by the full line, and it is closed over all the poles and embraces the shaft of the rotor.

When the rotor is further rotated at an angle of 45 degrees the said differential flux is decreased to zero, and after a further rotation at an angle of 45 degrees it has again assumed its maximum value, but it flows in the opposite direction. It appears therefore, that by the continuous rotation of the rotor the shaft of the rotor is embraced by an oscillating flux of the maximum value of $$\frac{F_1 - F_2}{2}$$

which flux passes over a path which is stationary relatively to the stator and which is indicated by the full line in Fig. 2, and which continuously changes the direction of its rotation at a frequency which corresponds to the number of revolutions of the machine. The said differential flux $$\frac{F_1 - F_2}{2}$$

induces the voltage in the shaft of the rotor which causes the aforesaid injurious currents in the bearing bushings.

In Fig. 3 an example is shown in which the said differential flux is counteracted by a subsidiary winding which is closed in itself and which is located on the stator. The said winding consists of a plurality of electrically opposed sections $a_1$, $a_2$, $a_3$, $a_4$ arranged in a manner similar to a ring winding. In the example shown four sections of the winding are provided. One half of the said sections, that is to say the windings $a_1$ and $a_2$ are located at the points of the maximum field $F_1$ and the other half, that is to say the windings $a_3$ and $a_4$, are located at the points of the minimum field $F_2$, and are connected in opposition to the first named windings. In the windings which are located at the points of stronger or weaker fields currents are induced which tend to decrease or increase the intensities of the maximum or minimum field respectively, until the differences of the field which are the causes for the bearing currents and bearing voltages are balanced. Or in other words, in the windings $a_1$ $a_2$ a voltage is produced which is proportional to the flux $F_1$, and in the windings $a_3$ $a_4$ a voltage is produced which is proportional to the flux $F_2$, so that in the whole short-circuited winding $a_1$ $a_2$ $a_3$ $a_4$ a resulting voltage is produced which is proportional to the difference $F_1 - F_2$, and which counteracts the injurious voltage $$\frac{F_1 - F_2}{2}$$

In the example shown in Fig. 4 the said differential flux is not reduced to zero, but the voltage in the bearings is counteracted by generating a voltage which is equal thereto. The sections $a_1$ $a_2$ $a_3$ $a_4$ of the subsidiary winding have the same position as in the example described with reference to Fig. 3, but the windings $a_1$ and $a_2$ are connected in shunt with each other, and they are connected in opposition to the other sections $a_3$ and $a_4$ which are likewise connected in shunt with each other. The resulting voltage induced in the subsidiary winding which is proportional to the differential flux $F_1 - F_2$ of the stator is transmitted, preferably over a transformer $t$, to the winding of one or more rings of sheet iron $e_1$ $e_2$ which are located around the shaft $w$ $w$ of the rotor. Therefore in the sheet iron rings $e_1$ $e_2$ a field is produced which is proportional to the differential field $F_1 - F_2$, and which produces the voltage which counteracts the voltage of the shaft (which is proportional to the differential flux $$\frac{F_1 - F_2}{2}$$

of the rotor), and which under certain circumstances exactly balances the same.

Fig. 6 shows a dynamo-electric machine in which the stator $s$ and the rotor $l$ are mounted for relative rotation, the stator being mounted upon the base plate T, and the rotor shaft $w$ being mounted for rotation in bearings B on the base plate. The rings $e_1$ and $e_2$ are suitably supported and surround the shaft $w$. The rest of the construction is shown in diagram in Fig. 4, and further description will therefore be unnecessary.

The example shown in Fig. 5 differs from that shown in Fig. 4 only in this respect, that the windings $a_1$, $a_2$ and $a_3$, $a_4$ two of which form one half of the winding are connected in series, and that the currents of the sheet iron rings $e_1$ $e_2$ can be regulated either by means of an autotransformer $t_1$, or a resistance $r$, or by changing the number of the windings on the sheet iron rings $e_1$ $e_2$. These means may be used either separately or in combination with each other for producing a phase difference which is necessary under certain circumstances.

In accordance with this invention therefore, a force is set up in the machine which counteracts the force which tends to set up currents in the frame and bearings. In Figs. 4 and 5 this force is an electromotive force which counteracts or balances the electromotive force which tends to set up currents in the frame and bearings. In Fig. 3 this force is the magnetomotive force which prevents a fluctuation of the field fluxes in the different quadrants when the reluctances of the magnetic circuits of the quadrants vary.

I claim herein as my invention;

1. In a system for preventing currents in the shaft and bearings of a dynamo electric machine, the combination of a stator, a rotor, a frame including a shaft and bearings to support the stator and rotor for relative rotation, and means, subject to the field fluctuation, tending to set up currents in the shaft and bearings and arranged to counteract the currents tending to flow in the shaft and bearings.

2. In a dynamo electric machine, the combination of inductively arranged members including a stator and a rotor, one of said members having unsymmetrical parts, means for supporting the stator and rotor in operative relation, and means subject to a flux proportional to the difference of the fluxes in said unsymmetrical parts of one of said members, said means tending to set up currents in said supporting means and arranged to counteract the current tending to flow in said supporting means.

3. In a dynamo electric machine, the combination with a stator and a rotor and means for supporting said members for relative rotation, said supporting means being exposed to fluxes which tend to set up an electromotive force therein, and a winding exposed to said fluxes adapted to set up an electromotive force for balancing said electromotive force which tends to be set up.

4. In a dynamo-electric machine, the combination with a stator and a rotor and a shaft and bearings for supporting said members for relative rotation, said shaft and bearings being exposed to fluxes which tend to set up currents in said shaft and bearings, and a winding on said machine exposed to said fluxes and adapted to set up a force in said machine to counteract their action in setting up said currents.

In testimony whereof I have signed my name to this specification in the presence of two subscribing witnesses.

WALTHER FRICK.

Witnesses:
ERWIN DEVESELY,
MICHAEL POLK.

---

Copies of this patent may be obtained for five cents each, by addressing the "Commissioner of Patents, Washington, D. C."